(12) United States Patent
Fernando et al.

(10) Patent No.: US 9,341,015 B2
(45) Date of Patent: May 17, 2016

(54) ENERGY-EFFICIENT FILM (71) Applicant: Nexeon Energy Solutions LLC, Albany, NY (US)

(72) Inventors: Primal M. Fernando, Henderson, NV (US); Stephen E. Fischer, Berthoud, CO (US)

(73) Assignee: NEXEON ENERGY SOLUTIONS LLC, Albany, NY (US)

( * ) Notice: Subject to any disclaimer, the term of this patent is extended or adjusted under 35 U.S.C. 154(b) by 0 days.

(21) Appl. No.: 14/082,570

(22) Filed: Nov. 18, 2013

(65) Prior Publication Data
US 2014/0141192 A1 May 22, 2014

Related U.S. Application Data (60) Provisional application No. 61/729,166, filed on Nov. 21, 2012.

(51) Int. Cl.
*E06B 3/677* (2006.01)
*B32B 17/06* (2006.01)
*B32B 27/36* (2006.01)

(52) U.S. Cl.
CPC .............. *E06B 3/6775* (2013.01); *B32B 17/064* (2013.01); *B32B 27/36* (2013.01); *B32B 2307/42* (2013.01); *Y10T 428/239* (2015.01)

(58) Field of Classification Search
CPC .............................. E06B 3/6722; E06B 3/6725
USPC .................... 349/155, 150, 153, 160; 428/76; 156/107
See application file for complete search history.

(56) References Cited

U.S. PATENT DOCUMENTS

| 4,705,360 A * | 11/1987 | Funada ................. G02F 1/1337 349/123 |
| 6,285,435 B1 * | 9/2001 | Inoue .................. G02F 1/13392 349/153 |
| 7,352,428 B2 * | 4/2008 | Anderson ......... G02F 1/133382 349/153 |
| 2002/0085151 A1 * | 7/2002 | Faris ..................... B82Y 15/00 349/117 |
| 2002/0118335 A1 * | 8/2002 | Tannas, Jr. ............ G02F 1/1339 349/187 |
| 2009/0284821 A1 * | 11/2009 | Valentin ............ B32B 17/10036 359/273 |
| 2009/0303402 A1 * | 12/2009 | Kumar ..................... E06B 9/40 349/16 |

(Continued)

FOREIGN PATENT DOCUMENTS

| EP | 0 816 902 A2 | 1/1998 |
| WO | WO 98/38547 A1 | 9/1998 |
| WO | WO 03/083523 A2 | 10/2003 |

OTHER PUBLICATIONS

"Selecting Windows for Energy Efficiency", What's New in Building Energy Efficiency, U.S. Department of Energy, Jan. 1997, pp. 1-16, USA.

(Continued)

*Primary Examiner* — Sang V Nguyen
(74) *Attorney, Agent, or Firm* — Karish & Bjorgum, PC (57) ABSTRACT

An energy-efficient film is provided. The film includes a first transparent substrate, a second transparent substrate, a liquid crystal layer provided between the first transparent substrate and the second transparent substrate, and a gasket provided on an outer edge of the liquid crystal layer. The gasket may also be provided on outer edges of the first transparent substrate and the second transparent substrate.

17 Claims, 7 Drawing Sheets

(56) References Cited

U.S. PATENT DOCUMENTS

| | | | | |
|---|---|---|---|---|
| 2010/0045924 | A1* | 2/2010 | Powers | G02B 5/23 349/190 |
| 2011/0234944 | A1* | 9/2011 | Powers | C09K 19/544 349/86 |
| 2011/0261276 | A1* | 10/2011 | Yu | G02B 6/0028 349/16 |
| 2012/0002125 | A1* | 1/2012 | Oki | B32B 7/02 349/16 |
| 2012/0327318 | A1* | 12/2012 | Tamura | B32B 17/10036 349/16 |

OTHER PUBLICATIONS

"Energy Star Eligibility Criteria for Residential Windows, Doors and Skylights", Version 5.0 Apr. 7, 2009, pp. 1-3.

English-language International Search Report (PCT/ISA/220 & PCT/ISA/210) dated Apr. 15, 2014 (3 pages).

English-language Written Opinion (PCT/ISA/237) dated Apr. 15, 2014 (6 pages).

International Preliminary Report on Patentability (PCT/IB/326 & PCT/IB/373) including Written Opinion (PCT/ISA/237) dated Jun. 4, 2015 (eight pages).

\* cited by examiner

ENERGY-EFFICIENT FILM

CROSS-REFERENCE TO RELATED APPLICATIONS

This Application claims the benefit of U.S. Provisional Patent Application No. 61/729,166, filed Nov. 21, 2012, the entire contents of which are incorporated herein by reference.

BACKGROUND OF THE INVENTION

Most normal, non-energy-efficient, vehicle and building windows use a single glass pane that readily conducts heat. Normal windows transfer energy by (1) non-solar heat gain by direct conduction, convection, and radiation through the glass; (2) solar heat gain in the form of radiation; and (3) airflow from both ventilation and infiltration through the glass. There are also commercially available window technologies with increased energy benefits that control heat intrusion into vehicles and buildings. One type of energy-efficient window has multiple panes, for example, double, triple, or quadruple panes, of glass that minimize heat transfer with insulating air spaces between the panes. Efficiency is further increased when the insulating spaces are filled with nontoxic gases such as krypton or argon, and when low-conductivity pane spacers are used between the panes. Another way of decreasing heat transfer through glass is to apply a low-emissivity, or low-e, coating to the glass surface. A low-e coating is typically a microscopically thin metal or metallic oxide layer that is applied to an outside glass pane. The low-e coating inhibits radiation from passing through the glass. The low-e coating also keeps buildings cooler in the summer by reflecting sunlight. In the winter, low-e coatings on interior panes maintain indoor temperatures by preventing heat from escaping. Other ways of decreasing heat transfer through glass include the application of a colored, dyed, or reflective film that is affixed to glass. Related art energy-efficient windows and energy efficiency ratings are described in "Selecting Windows for Energy Efficiency", US Department of Energy Publication, DOE/GO-DE-AC03-76SF00098 PUB-788 January 1997—5000.

The heat gain through a window is typically measured by energy performance characteristics such as U-factor, R-value, Solar Heat Gain Coefficient (SHGC), and Visible Light Transmittance (VT or VLT). Low-e coatings reflect heat back into the home during cold weather and back to the outdoors during warm weather, and lower the U-factor of a window, but are not as efficient at insulating as multiple pane windows. Multiple pane windows are subject to loss of insulating gas and decreased energy efficiency over time. Colored, dyed, or reflective windows are limited in the amount of light that is let into a room (visible light transmittance). And window films with a fixed tint, while desired by users during bright sunlight days, are undesirable on cloudy days and in the evenings. Tinted windows are also architecturally undesirable in many applications.

Accordingly, it would be advantageous to provide thermally efficient window films and windows that transmit a maximum fraction of incident visible light intensity, while blocking the radiant energy of the sun and insulating against thermal energy transfer. It would also be advantageous to provide window films and windows for cold climates that have a solar heat gain coefficient that maximizes heat gain during winter, with a U-factor which reduces conductive heat transfer, and a high visible transmittance for good light transfer. In addition, it would be advantageous to provide a film that can be applied to a regular window, thereby converting the window into an energy-efficient window. Further, it would be advantageous for the film to be flexible, such that it can bend to accommodate non-planar surfaces.

SUMMARY OF THE INVENTION

According to an aspect of the invention, a film is provided. The film includes a first transparent substrate, a second transparent substrate, a liquid crystal layer provided between the first transparent substrate and the second transparent substrate, and a gasket provided on an outer edge of the liquid crystal layer. The gasket may also be provided on outer edges of the first transparent substrate and the second transparent substrate.

The film may also include a first transparent conductive layer provided between the first transparent substrate and the liquid crystal layer, and a second transparent conductive layer provided between the second transparent substrate and the liquid crystal layer. In this embodiment, the gasket may also be provided on outer edges of the first transparent substrate, the second transparent substrate, the first transparent conductive layer, and the second transparent conductive layer. The gasket may be an adhesive, and the gasket may include a plurality of spacers.

The film may also include an infrared (IR) reflecting layer or an ultraviolet (UV) reflecting layer. Further, the film may also include at least one polarizing layer. In addition, the film may also include a polyamide layer arranged between the liquid crystal layer and the first transparent conductive layer, or between the liquid crystal layer and the second transparent conductive layer. The first and second transparent substrates may be substantially flexible to conform to a curved surface.

The liquid crystal layer may include a liquid crystal material and a plurality of spacers. The spacers may be rods that are arranged such that a diameter of the rods defines a height of the liquid crystal layer. Alternatively, the spacers may include rods, sticky balls, and/or nanostructures. The spacers may occupy approximately 10 to 20 percent of the liquid crystal layer by volume.

According to another aspect of the invention, a glass panel is provided. The glass panel includes a glass pane and one or more films. Each film is secured to an adjacent film by an adhesive layer. Each film includes a first transparent substrate, a second transparent substrate, a liquid crystal layer provided between the first transparent substrate and the second transparent substrate, and a gasket provided on an outer edge of the liquid crystal layer.

The glass pane may be curved, and the first and second transparent substrates may be substantially flexible to conform to the curved glass pane. The glass pane may include glass used in building windows, glass used in doors, glass used in skylights, automotive glass, glass used in aircraft, maritime glass, and/or any other glass used to create a barrier between an inside and an outside space.

According to another aspect of the invention, a method of preparing a film is provided. The method includes:

a) providing a first transparent substrate;

b) depositing a gasket on an outer edge portion of the first transparent substrate;

c) depositing a liquid crystal layer on the first transparent substrate and within the boundary formed by the gasket;

d) positioning a second transparent substrate on the liquid crystal layer and within the boundary formed by the gasket; and e) curing an adhesive within the gasket.

The method may also include depositing an additional layer on the film. The additional layer may be a protective layer, an IR reflective layer, a UV reflective layer, and/or a polarizing layer. The liquid crystal layer may be deposited by spraying a mixture of liquid crystal material and spacers on the first transparent conductive layer.

According to another aspect of the invention, another method of preparing a film is provided. The method includes:

a) providing a first transparent substrate;

b) depositing a gasket on a top surface of the first transparent substrate adjacent to an outer edge of the first transparent substrate;

c) depositing a liquid crystal layer on the first transparent substrate and within the boundary formed by the gasket;

d) positioning a second transparent substrate on the liquid crystal layer and the gasket; and e) curing an adhesive within the gasket.

Other objects, advantages, and novel features of the present invention will become apparent from the following detailed description of the invention when considered in conjunction with the accompanying drawings.

DETAILED DESCRIPTION OF EXEMPLARY EMBODIMENTS

According to embodiments of the present invention, an energy-efficient film to be applied to a surface is provided. The energy-efficient film may be applied to windows, doors, skylights, automobile glass, glass used in aircraft, maritime glass, or any other glass surface. For example, the energy-efficient film may be applied to glass that requires thermal insulation and protection from infra-red (IR) radiation and/or UV radiation. The energy-efficient film may function as a thermally insulating barrier to the transfer of heat into or out of vehicles or buildings. Further, the energy-efficient film may be applied to any other surface, such as metal or drywall, in order to provide thermal insulation. The insulating properties of the energy-efficient film are derived from the materials and construction methods used in constructing the film, as discussed in further detail below.

The energy-efficient film according to embodiments of the invention may be flexible, and may be applied on the surface of regular windows. The energy-efficient film is also durable and thin enough to be applied on a vehicle window. In some embodiments, the energy-efficient film includes a shock absorbing layer and/or a protective layer to prevent damage to the film and the window. The energy-efficient film may also be formed to provide a safety layer, in order to convert regular window glass to have the same properties as a laminated window, such as an automobile windshield.

A transparent energy-efficient film includes first and second substantially flexible transparent confining films, and one or more thermally insulating layers, such as a liquid crystal layer. The film may include one or more IR and/or UV reflecting or absorbing layers.

The energy-efficient film can be applied on a window panel that is already installed, such as a regular window pane on a building or an automobile. The energy-efficient film does not need to be sandwiched between two window panels or panes. In some embodiments, the film may be self-supporting.

As used herein, the following terms have the following meanings.

"R-value" refers to the resistance of a window, door, or skylight to heat conduction, and is the inverse of the U-factor (that is, R-value=1/U-factor). The higher the R-value, the more energy-efficient the window, door, or skylight.

"U-factor" is the rate at which a window, door, or skylight conducts non-solar heat flow. It is usually expressed in units of $Btu/hr\text{-}ft^2\text{-}°F$. The lower the U-factor, the more energy-efficient the window, door, or skylight.

"Solar heat gain coefficient" (SHGC)! is the fraction of solar radiation admitted through a window, door, or skylight—either transmitted directly and/or absorbed, and subsequently released as heat inside a space. The lower the SHGC, the less solar heat is transmitted and the greater the shading ability. A high SHGC rating is more effective at collecting solar heat during the winter. A low SHGC rating is more effective at reducing cooling loads during the summer by blocking heat gain from the sun.

"Transparent substrate" is a substrate having a high visible light transmittance (VT or VLT).

"Visible transmittance" (VT) or "visible light transmittance" (VLT) is the amount of light in the visible portion of the spectrum that passes through a window glass. A higher VT means there is more daylight in an interior space. The VT of glazing ranges from above 90% for uncoated water-white clear glass to less than 10% for highly reflective films on a window glass.

Figure 1A:
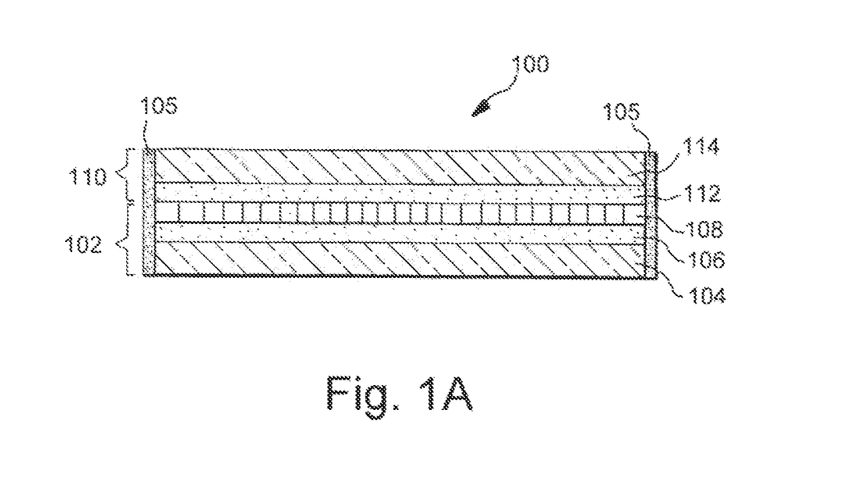
FIG. 1A is a cross-sectional view of an energy-efficient window film according to one embodiment of the invention.

The figures are not drawn to scale, and should not be interpreted as indicating relative proportions of the components therein. Referring now to FIG. 1A, an energy-efficient film 100 for minimizing radiation entering an interior space through the film 100 is provided. The film 100 includes a first transparent layer 102 having a first transparent substrate 104 and a first transparent conductive layer 106, which is deposited on one surface of the first transparent substrate 104. A liquid crystal layer 108 is positioned on top of the first transparent conductive layer 106 to form the first transparent layer 102. A second transparent layer 110 having a second transparent substrate 114 and a second transparent conductive layer 112 is arranged on top of the first transparent layer 102.

However, the first and second transparent conductive layers 106, 112 are not required, and may be omitted from the film 100 shown in FIG. 1A.

Each of the first and second transparent substrates 104, 114 is a transparent base film that is preferably a substantially flexible polymer that has enough flexibility to conform to a curved surface, such as a curved window, particularly a curved automobile window. The transparent base film preferably has a high visible light transmittance, such as greater than 80%. Examples of suitable transparent base films include polyethylene films and other polymeric films, such as polyester, triacetate, or polycarbonate. One example of a transparent base film is polyethylene terephthalate (PET).

The optional first and second transparent conductive layers 106, 112 may include, for example, transparent metal oxides, such as indium tin oxide, or other oxide layers, such as zinc oxide, which enhance the energy efficiency of the film 100. Other examples of materials for the transparent conductive layers 106, 112 include one or more layers of graphene, low-e coatings, such as Solarban® products, commercially available from PPG Industries, and other low-e coatings known to those of skill in the art.

Figure 1B:
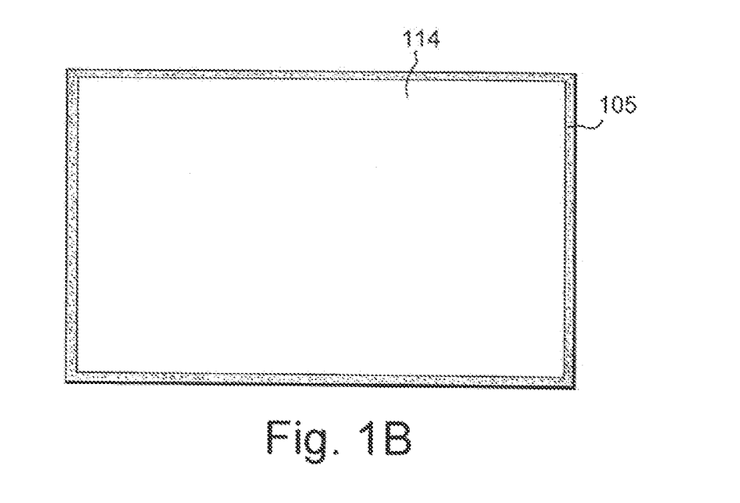
FIG. 1B is a top perspective view of the energy-efficient window film shown in FIG. 1A.

As shown in FIG. 1A, a gasket 105 is arranged on the outer edges of the layers 104, 106, 108, 112, and 114. FIG. 1B shows a top view of the film 100 shown in FIG. 1A. As shown in FIG. 1B, the gasket 105 forms the outer perimeter of the film 100. The gasket 105 is an adhesive, such as pressure sensitive adhesive, a heat sensitive adhesive, a moisture sensitive adhesive, or a UV-curable adhesive. The gasket 105 seals the film 100, provides structural support for the film 100, and maintains the desired arrangement and spacing of the layers 104, 106, 108, 112, and 114. The gasket 105 may include spacers, such as rods, sticky balls, or nanostructures, as described in further detail below. It may be advantageous to include more spacers as the thickness of the layers 104, 106, 108, 112, and 114 decreases, in order to maintain the structure of the film 100.

Figure 1C:
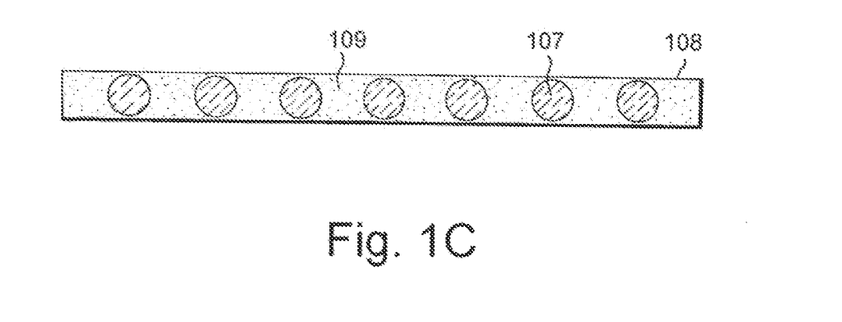
FIG. 1C is a cross-sectional view of the liquid crystal layer within the energy-efficient window film shown in FIG. 1A.

As shown in FIG. 1C, the liquid crystal layer 108 may also include spacers 107. In the embodiment shown in FIG. 1C, the spacers 107 are rods that lie on their sides in order to maintain a uniform spacing between the first transparent conductive layer 106 and the second transparent conductive layer 112. In this embodiment, the diameter of the rods determines the spacing between the first transparent conductive layer 106 and the second transparent conductive layer 112 (i.e., the thickness of the liquid crystal layer 108). The spacers 107 may occupy approximately 10-20% of the liquid crystal layer 108 by volume, while the remainder of the liquid crystal layer 108 is occupied by a liquid crystal material 109. The spacers 107 may be sticky spacers (e.g., ceramic structures with adhesive), rods (e.g., glass or silicon rods), or nanostructures. The sticky spacers may have a spherical shape and be coated with an adhesive. The liquid crystal material 109 may include, for example, a variety of electro-optic materials. For example, the liquid crystal material 109 may include liquid crystals such as E7, polymer liquid crystals, or other optical materials such as nonlinear optical materials.

Figure 1D:
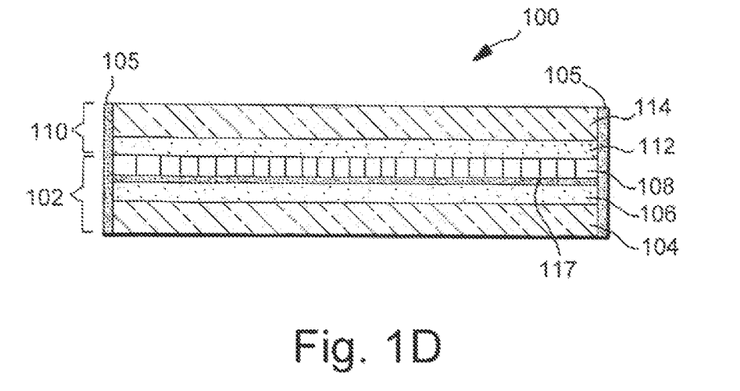
FIG. 1D is a cross-sectional view of another embodiment of the energy-efficient window film.

Referring now to FIG. 1D, another embodiment of the film 100 shown in FIG. 1A is shown. As shown in FIG. 1D, the film 100 may contain one or more polyamide layers 117. For example, a polyamide layer 117 may be deposited on top of the transparent conductive layer 106, or at any other appropriate position. After deposition of the polyamide layer 117, the polyamide layer 117 may be cured with heat. The polyamide layer 117 imparts enhanced thermal properties to the film 100, because the polymer within the polyamide layer 117 absorbs some of the heat that is incident on the film 100. Accordingly, less heat reaches the liquid crystal layer 108, and the thermal insulation provided by the film 100 is improved. Again, the first and second transparent conductive layers 106, 112 are not required, and may be omitted from the film 100 shown in FIG. 1D.

Figure 2:
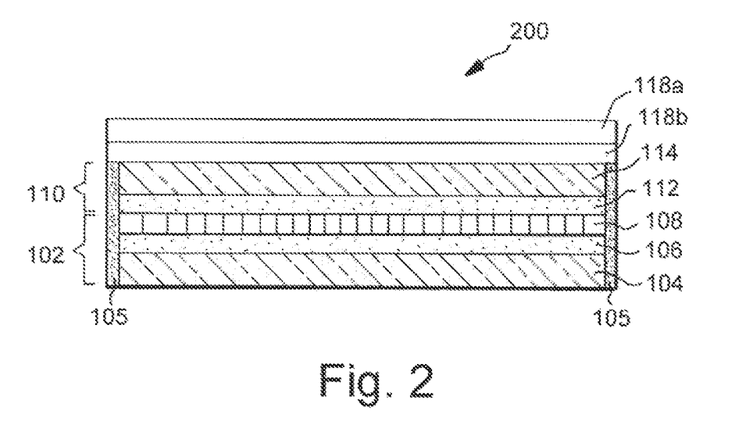
FIG. 2 is a cross-sectional view of an energy-efficient window film according to another embodiment of the invention.

Referring now to FIG. 2, another embodiment of the energy-efficient film described above with reference to FIG. 1 is shown, with like numbers referring to like elements. The film 200 includes a first transparent layer 102 having a first transparent substrate 104 and a first transparent conductive layer 106, which is deposited on one surface of the first transparent substrate 104. A liquid crystal layer 108 is positioned on top of the first transparent conductive layer 106 to form the first transparent layer 102. A second transparent layer 110 having a second transparent substrate 114 and a second transparent conductive layer 112 is arranged on top of the first transparent layer 102. As described above with reference to FIG. 1B, the film 200 also includes a gasket 105 that forms the outer perimeter of the film 200. Again, the first and second transparent conductive layers 106, 112 are not required, and may be omitted from the film 200 shown in FIG. 2.

According to the embodiment shown in FIG. 2, the film 200 may have one or more supplementary layers 118 deposited onto or otherwise adhered to the first or second transparent layers 102 and/or 110. For example, as shown in FIG. 2, the supplementary layers shown as 118a, 118b may be positioned on the second transparent layer 110. However, the supplementary layers 118 may be otherwise positioned on the film 200, as will be understood by those of skill in the art. The supplementary layers 118 may be one or a combination of a UV protective layer, an IR reflecting layer, one or more polarizing layers, a shock absorbing layer, and/or a light reflective layer. Other overcoats, such as polymer or inorganic thin layers for prevention of penetration of moisture to the liquid crystal 108, may also be used in accordance with embodiments of the invention.

In one preferred embodiment, the polarizers may be reflective in nature. The reflective polarizers may be birefringence-based, or may be wire grids of metals that may further reflect IR light and at least partially block UV light. Further, the polarizers may be absorptive in nature, in which case the selection of polarization is achieved by absorbing light in the unwanted polarization direction by the polarizing film.

By including or omitting a polarizing layer, varying the amount of transparent conductive layer on the film, and varying the thickness of the liquid crystal layer, the U-values and SHGC may be varied. Accordingly, the properties of the films described herein can be varied to accommodate and optimize the films for various climates. Examples will be discussed in further detail below.

Figure 3:
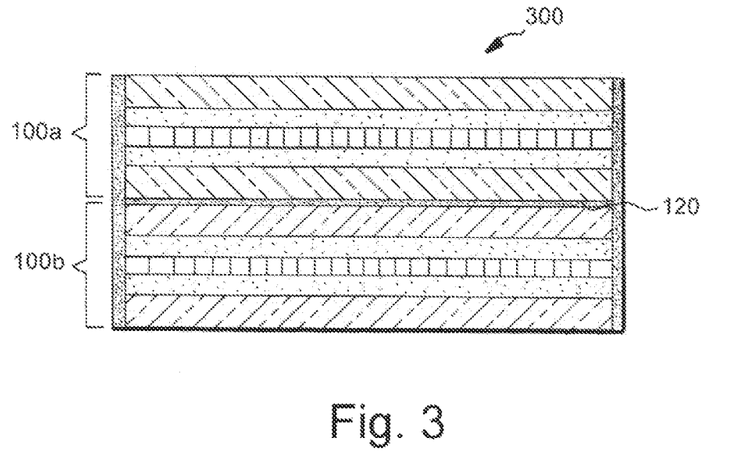
FIG. 3 is a cross-sectional view of a multi-layer energy-efficient window film according to another embodiment of the invention.

Referring now to FIG. 3, a multi-layer window film 300 for minimizing radiation entering an interior space through the film is shown. The multi-layer film includes two or more films, shown as 100a, 100b in FIG. 3. The films 100a, 100b are described above, with reference to one or both of the films described in FIG. 1 and FIG. 2, where like numbers refer to like elements. The films 100a, 100b are adhered to each other via an adhesive layer 120. The multi-layer film 300 is constructed with at least two layers of substantially flexible transparent energy-efficient film 100a, 100b. The first substantially flexible and transparent energy-efficient film 100a may be an outdoor side, and may have a polarizer and/or a UV-resistant film attached to the outer surface (not shown). The outer side of the UV film may also have an adhesive on the outer surface for attachment to a glass window. The polarization layer may be used to absorb or reflect a fraction of visible light, depending on the choice of polarizers and the polarization state of the light.

Referring again to FIGS. 1-3, an outer adhesive (not shown), such as a pressure sensitive adhesive, a heat sensitive adhesive, or a moisture sensitive adhesive, may be deposited or otherwise adhered to the film 100, 200, 300, respectively. The outer adhesive may be used in embodiments where the film 100, 200, 300 is adhered to a glass substrate. A release layer (not shown) may also be applied to the surface of the outer adhesive, such that the film may be transported and applied to a window by an end user.

Figure 4A:
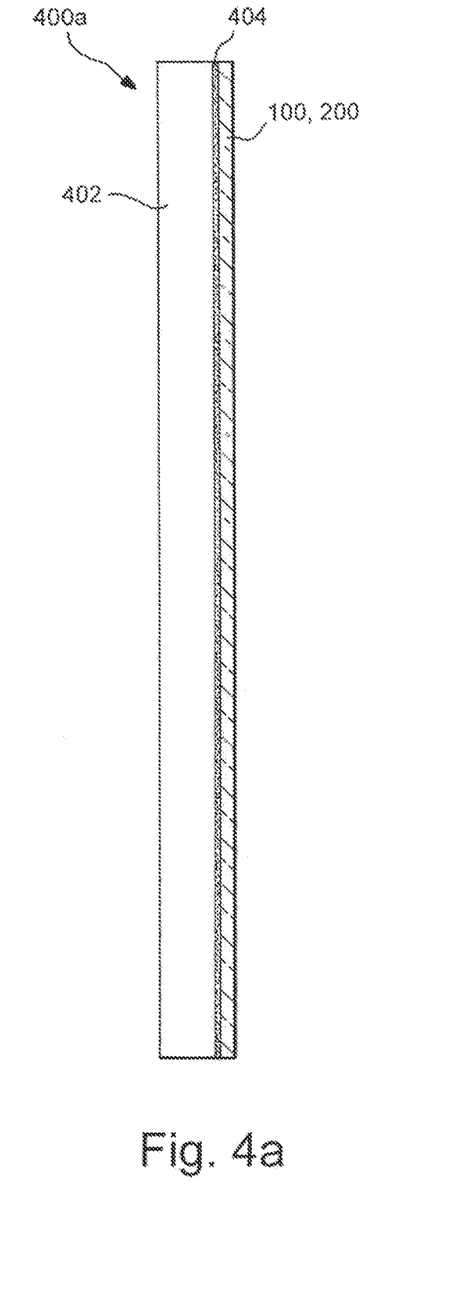
FIG. 4A is a cross-sectional view of an energy-efficient glass panel having a single energy-efficient film, according to another embodiment of the invention.
Figure 4B:
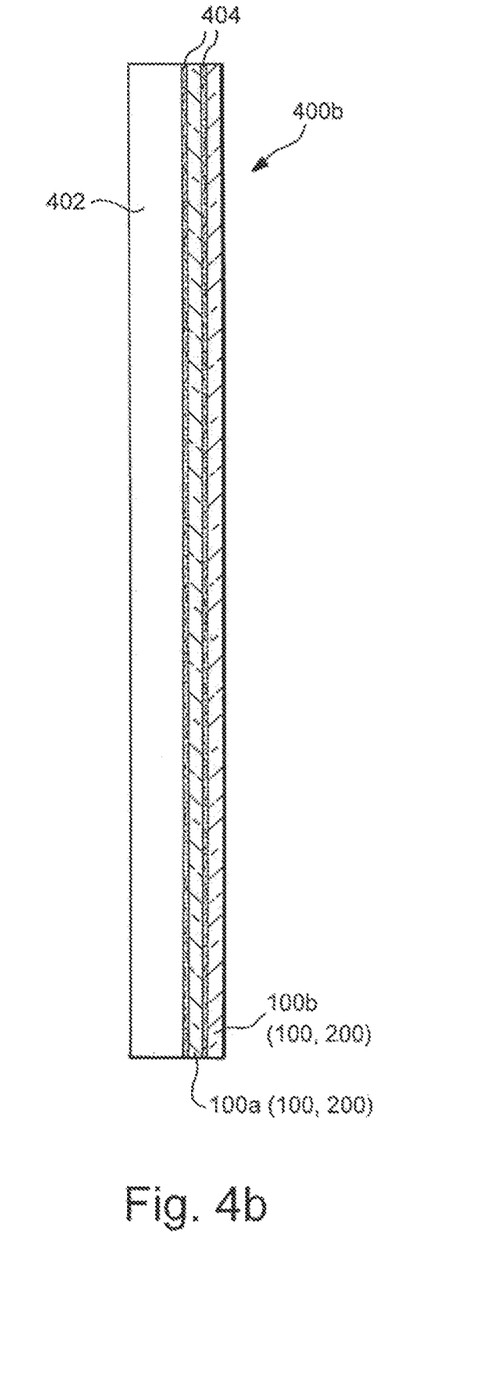
FIG. 4B is a cross-sectional view of an energy-efficient glass panel having two energy-efficient films joined by an adhesive layer, according to another embodiment of the invention.

Referring now to FIG. 4A and FIG. 4B, energy-efficient glass panels incorporating one or more of the energy-efficient films of embodiments of the invention are shown, with like numbers referring to like elements. An energy-efficient glass panel 400a is shown in FIG. 4A. The energy-efficient glass panel 400a includes an energy-efficient film 100 (or other film 100, 200, as described herein), which is adhered to a glass pane 402 with an adhesive 404. FIG. 4B shows an energy-efficient glass panel 400b. The energy-efficient glass panel 400b includes a first energy-efficient film 100a (or other film 100, 200, as described herein), which is adhered to a glass pane 402 with an adhesive 404. A second energy-efficient film 100b (or other film 100, 200, as described herein) is adhered to the first energy-efficient film 100a with an adhesive 404. The energy-efficient glass panel 400a, 400b may have one or more supplemental layers 118 (not shown), as described herein. In some embodiments, the glass pane 402 may be curved, and the energy-efficient films 100 may be substantially flexible to conform to the curved glass pane 402.

Figure 5:
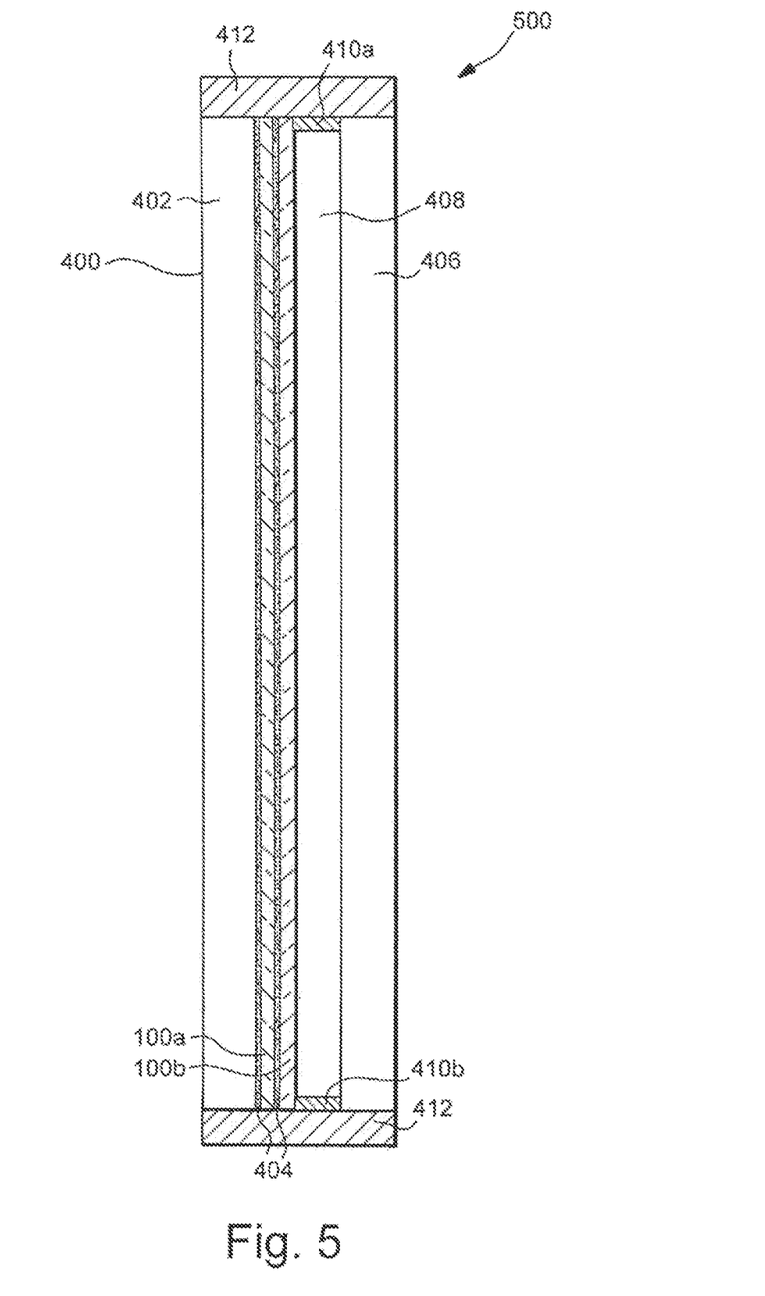
FIG. 5 is a cross-sectional view of an energy-efficient window according to another embodiment of the invention.

Referring now to FIG. 5, a window 500 using the energy-efficient glass panel 400 described in reference to FIG. 4 is shown, with like numbers referring to like elements. The window 500 includes an energy-efficient glass panel 400, having a glass pane 402 and one or more energy-efficient films 100a, 100b. Although two energy-efficient films 100a, 100b, are shown in FIG. 5, it will be understood by those of skill in the art that fewer or additional energy-efficient films e.g., three, four, or more films 100, 200 may be used, with additional films increasing the energy efficiency of the window 500. A glass pane 406 defines an air space 408 between the energy-efficient glass panel 400 and the glass pane 406. Pane spacing members 410a, 410b are disposed between the energy-efficient glass panel 400 and the glass pane 406 to maintain the energy-efficient glass panel 400 and the glass pane 406 in a spaced-apart relationship. A window frame 412 may provide further insulating elements for the window 500.

Figure 6A:
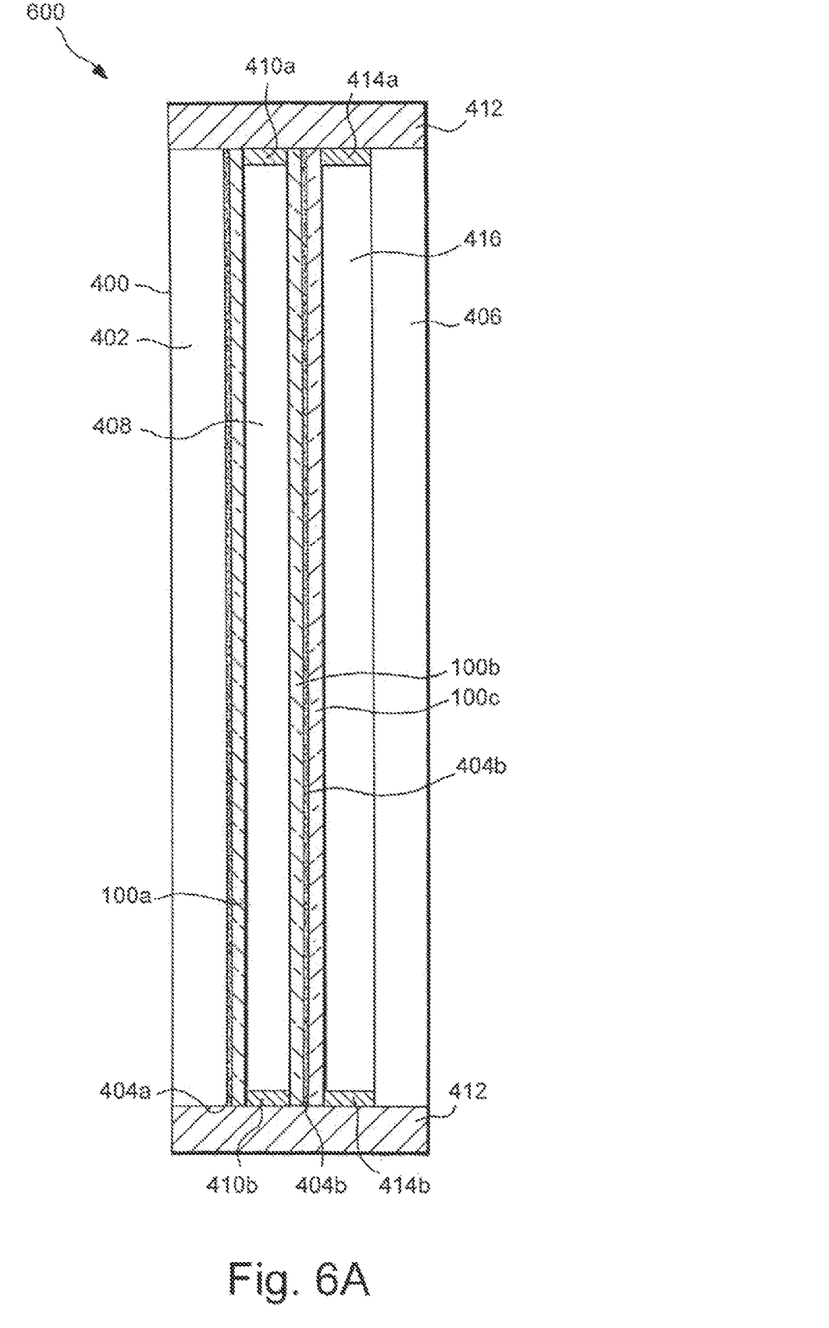
FIG. 6A is a cross-sectional view of an energy-efficient window according to another embodiment of the invention.

Referring now to FIG. 6A, a window 600 using the energy-efficient glass panel 400, described in reference to FIG. 4, is shown, with like numbers referring to like elements. The window 600 includes a glass pane 402 and one or more energy-efficient films 100a. One or more energy-efficient films 100b, 100c, which are secured to each other by an adhesive layer 404b, define a first air space 408 between the energy-efficient glass panel 400 and the one or more energy-efficient films 100b, 100c. First pane spacing members 410a, 410b are disposed between the energy-efficient glass panel 400 and the one or more energy-efficient films 100b, 100c, to maintain the energy-efficient glass panel 400 and the one or more energy-efficient films 100b, 100c in a spaced-apart relationship. Although one energy-efficient film 100a is shown in FIG. 6 in the energy-efficient glass panel, and two energy-efficient films 100b, 100c are shown in the interior space of the window, it will be understood by those of skill in the art that fewer or additional energy-efficient films e.g., two, three, four, or more films 100, 200 can be used, with additional films increasing the energy efficiency of the window 600. A glass pane 406 defines an air space 416 between the one or more films 100b, 100c and the glass pane 406. Second pane spacing members 414a, 414b are disposed between the one or more films 100b, 100c and the glass pane 406, to maintain the one or more films 100b, 100c and the glass pane 406 in a spaced-apart relationship. A window frame 412 may provide further insulating elements for the window 600.

Figure 6B:
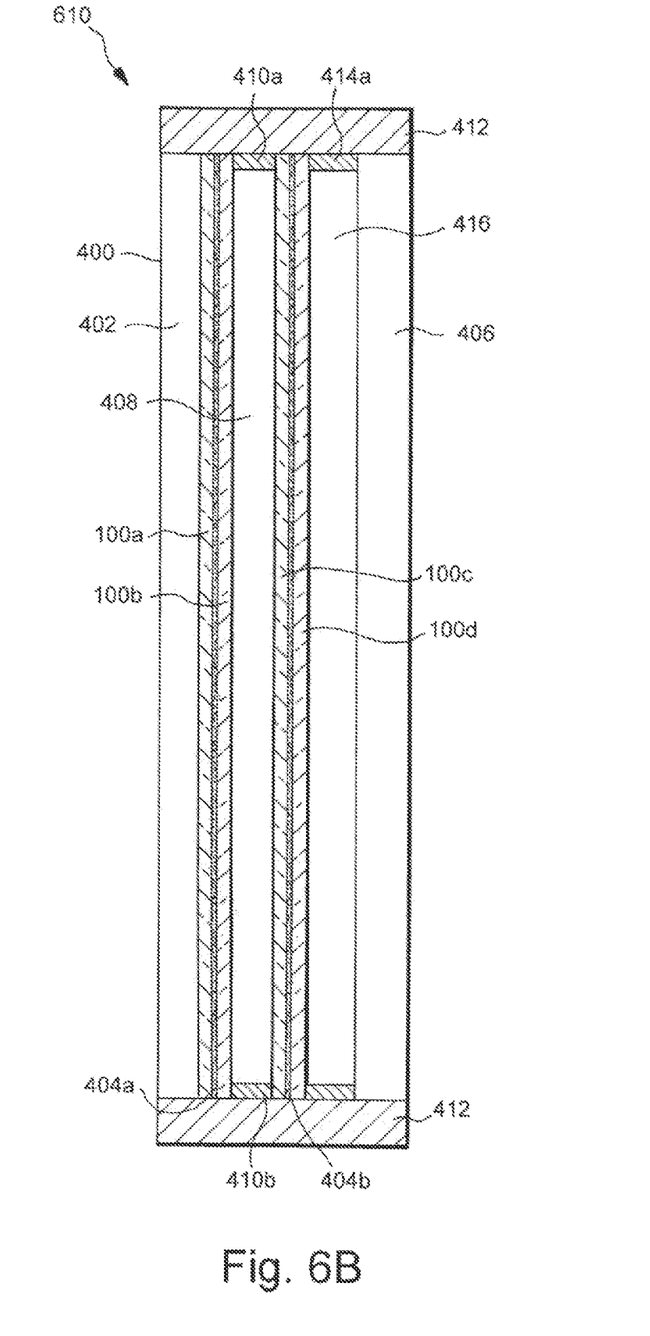
FIG. 6B is a cross-sectional view of an energy-efficient window according to another embodiment of the invention.

Referring now to FIG. 6B, another window 610 using the energy-efficient glass panel 400, described in reference to FIG. 4, is shown, with like numbers referring to like elements. The window 610 includes a glass pane 402 and two energy-efficient films 100a, 100b, which are secured to each other by an adhesive layer 404a. Two additional energy-efficient films 100c, 100d, which are secured to each other by an adhesive layer 404b, define a first air space 408 between the energy-efficient glass panel 400 and the energy-efficient films 100c, 100d. First pane spacing members 410a, 410b are disposed between the energy-efficient glass panel 400 and the energy-efficient films 100c, 100d, to maintain the energy-efficient glass panel 400 and the one or more energy-efficient films 100c, 100d in a spaced-apart relationship. A glass pane 406 defines an air space 416 between the energy-efficient films 100c, 100d and the glass pane 406. Second pane spacing members 414a, 414b are disposed between the energy-efficient films 100c, 100d and the glass pane 406, to maintain the one or more films 100c, 100d and the glass pane 406 in a spaced-apart relationship. A window frame 412 may provide further insulating elements for the window 610.

Figures 7, 8:
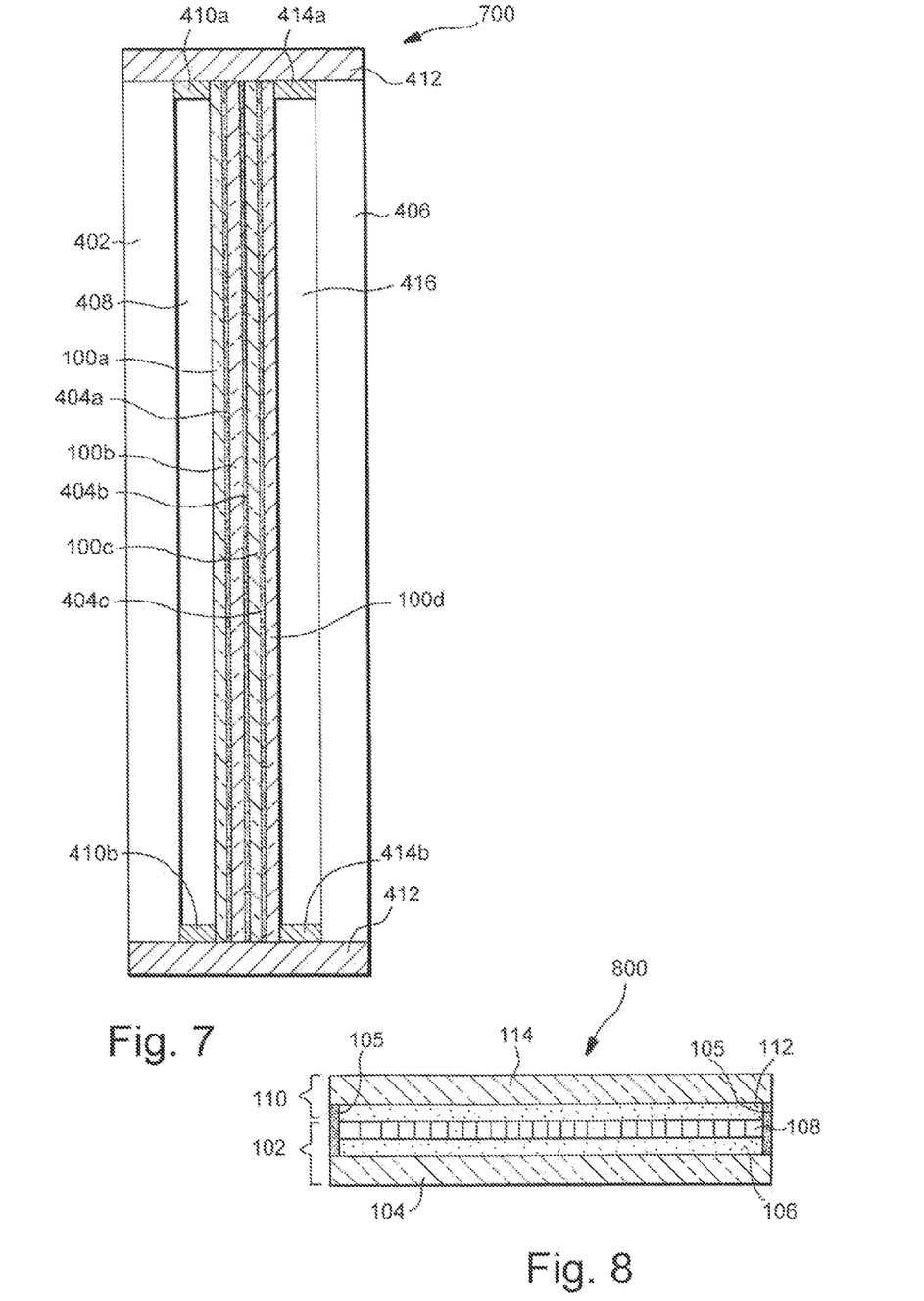
FIG. 7 is a cross-sectional view of an energy-efficient window including a multi-layer energy efficient film according to another embodiment of the invention.
FIG. 8 is a cross-sectional view of an energy-efficient window film according to another embodiment of the invention.

Referring now to FIG. 7, an energy-efficient window 700 includes a first glass pane 402 and one or more energy-efficient films 100 defining an air space 408 between the first glass pane 402 and the one or more energy-efficient films 100, wherein each film 100 is secured to an adjacent film 100 by an adhesive layer 404. For example, FIG. 7 shows four energy-efficient films 100a, 100b, 100c, and 100d, which are adhered to each other by three adhesive layers 404a, 404b, and 404c. However, it will be understood by those of skill in the art that fewer or additional energy-efficient films, e.g., one, two, three, four, or more films 100, 200 can be used, with additional films increasing the energy efficiency of the window 700. First pane spacing members 410a, 410b are disposed between the first glass pane 402 and the one or more energy-efficient films 100, to maintain the first glass pane 402 and the one or more energy-efficient films 100 in a spaced-apart relationship. An outer glass pane 406 defines an air space 416 between the one or more energy-efficient films 100 and the outer glass pane 406. Second pane spacing members 414a and 414b are disposed between the one or more energy-efficient films 100 and the outer glass pane 406, to maintain the one or more energy-efficient films 100 and the outer glass pane 406 in a spaced-apart relationship.

According to another embodiment of the invention, a method of improving the energy efficiency of a transparent surface by applying an energy-efficient film to the transparent surface is provided. The characteristics of the energy-efficient film may be selected according to the desired energy efficiency and solar heat gain. Some examples are discussed in further detail below. The liquid crystal layer of the energy-efficient film imparts thermal insulation to the transparent surface. The energy-efficient film may also be provided with an adhesive and release layer for ease of applying the energy-efficient film to the transparent surface.

According to another embodiment of the invention, a method of preparing a multi-layer energy-efficient film is provided. The method is described with reference to preparing the energy-efficient film 100 shown in FIG. 1A. The method includes providing a first transparent substrate 104. The first transparent substrate 104 may be provided as a film roll that is rolled out to a production line. Then a gasket 105 is deposited on an outer edge portion of the first transparent substrate 104. As discussed above, the gasket 105 is formed to provide an outer edge for the layers 104, 106, 108, 112, and 114 of the film 100. Accordingly, the gasket 105 must be sufficiently tall to accommodate the layers 104, 106, 108, 112, and 114. As discussed above, the gasket 105 may include spacers 107.

A first transparent conductive layer 106 may then be deposited on the first transparent substrate 104 within the boundary created by the gasket 105. The first transparent conductive layer 106 may be deposited by spraying, etching, or utilizing other deposition methods known to those of skill in the art. A liquid crystal layer 108 may then be deposited on the first transparent conductive layer 106 within the boundary created by the gasket 105. The liquid crystal layer 108 may be sprayed or otherwise deposited in a precise amount for the deposition area. Spacers 107 may be applied directly on the first transparent conductive layer 106, or may be mixed with the liquid crystal material 109, in which case the spacers 107 and the liquid crystal material 109 may be applied together to the first transparent conductive layer 106.

A second transparent substrate 114 is also provided. The second transparent substrate 114 may be provided as a film roll that is rolled out to a production line. A second transparent conductive layer 112 may then be deposited on one surface of the second transparent substrate 114 to form the second transparent layer 110. The second transparent layer 110 may then be positioned on top of the liquid crystal layer 108 of the first transparent substrate 104. Once the layers have been aligned to ensure direct contact between the gasket 105 and the second transparent substrate 114, the adhesive in the gasket 105 is cured to create the multi-layer energy-efficient film. For example, if the gasket 105 includes a UV-curable adhesive, the adhesive is cured by applying UV light. In another embodiment, at least one second film may be deposited on the multi-layer energy-efficient film. For example, the second film may be a supplementary film 118 as described above, such as a protective film, an IR reflective film, a UV reflective film, and/or a light polarizing film. As discussed above, the first and second transparent conductive layers 106, 112 are not required, and may be omitted from the method used to produce the film 100 shown in FIG. 1A.

According to another embodiment of the invention, another method of preparing a multi-layer energy-efficient film is provided. The method is described with reference to preparing the energy-efficient film 800 shown in FIG. 8. The method includes providing a first transparent substrate 104. The first transparent substrate 104 may be provided as a film roll that is rolled out to a production line. Then a gasket 105 is deposited on a top surface of the first transparent substrate 104 adjacent to an outer edge of the first transparent substrate 104. In this embodiment, the gasket 105 is not required to be self-supporting. As discussed above, the gasket 105 may include spacers 107.

A first transparent conductive layer 106 may then be deposited on the first transparent substrate 104 within the boundary created by the gasket 105. The first transparent conductive layer 106 may be deposited by spraying, etching, or utilizing other deposition methods known to those of skill in the art. A liquid crystal layer 108 may then be deposited on the first transparent conductive layer 106 within the boundary created by the gasket 105. The liquid crystal layer 108 may be sprayed or otherwise deposited in a precise amount for the deposition area. Spacers 107 may be applied directly on the first transparent conductive layer 106, or may be mixed with the liquid crystal material 109, in which case the spacers 107 and the liquid crystal material 109 may be applied together to the first transparent conductive layer 106.

A second transparent substrate 114 is also provided. The second transparent substrate 114 may be provided as a film roll that is rolled out to a production line. A second transparent conductive layer 112 may then be deposited on one surface of the second transparent substrate 114 to form the second transparent layer 110. The second transparent layer 110 may then be positioned on top of the liquid crystal layer 108 of the first transparent substrate 104, while the second transparent substrate 114 is positioned on top of the gasket 105. Once the layers have been aligned to ensure direct contact between the gasket 105 and the second transparent substrate 114, the adhesive in the gasket 105 is cured to create the multi-layer energy-efficient film. For example, if the gasket 105 includes a UV-curable adhesive, the adhesive is cured by applying UV light. In another embodiment, at least one second film may be deposited on the multi-layer energy-efficient film. For example, the second film may be a supplementary film 118 as described above, such as a protective film, an IR reflective film, a UV reflective film, and/or a light polarizing film. As discussed above, the first and second transparent conductive layers 106, 112 are not required, and may be omitted from the method used to produce the film 100 shown in FIG. 8.

The present invention is described more specifically in reference to certain embodiments contained in the examples below. It should be understood that the present invention is not intended to be limited by the following examples. As discussed in further detail below, samples of energy-efficient windows were prepared and tested according to the ASTM C 1363 standard to determine the U-factor of the total insulating glass unit, which included a pane spacer at the perimeter. During testing, thermocouples were placed on the interior and exterior surfaces to determine an average cold side and warm side surface temperature. Lawrence Berkeley National Laboratory's Window 6 program was then used to find an insulating glass unit with a similar warm side surface temperature in order to estimate the performance of the tested sample, excluding the negative effect of the perimeter spacer. The results of the testing are shown in Table 1. For each window, the U-factor was measured, and the R-value was calculated as the inverse of the U-factor. Further, the Center of Glass U-factor and the Center of Glass R-value were calculated via the Windows 6 program, by inputting the parameters of the materials used in each example. The Center of Glass U-factor and the Center of Glass R-value are the best estimations of the performance of the film as described herein, and may be used to estimate the performance of windows constructed to many different specifications where the difference in specifications and construction materials is factored into the calculations for the window as a unit, and the Center of Glass estimation is used as the performance characteristic for the film.

In the following examples, a window is defined as an Integrated/Insulated Glass Unit (IGU) that is inserted into a frame. Also in the following examples, the energy-efficient films within the IGUs did not include the first and second transparent conductive layers 106, 112, and a low-e coating was applied to the inner surface of the transparent glass pane 406.

Example 1

An energy-efficient IGU was created according to the embodiment shown in FIG. 5, having two layers of energy-efficient film 100a, 100b adhered to each other with adhesive 404. The two layers of energy-efficient film 100a, 100b were each prepared using PET as the transparent substrate and E7 as the liquid crystal. The resulting multi-layer film was adhered to a pane 402 of transparent glass to create an energy-efficient glass panel 400. The IGU was created by positioning pane spacing members 410a, 410b between the energy-efficient glass panel 400 and a second transparent glass pane 406. The R-value, U-factor, and Center of Glass for this IGU are shown in Table 1.

Example 2

An energy-efficient IGU was created according to the embodiment shown in FIG. 7, having four layers of energy-efficient film 100a, 100b, 100c, 100d adhered to each other with adhesive 404a, 404b, 404c. The four layers of energy-efficient film 100a, 100b, 100c, 100d were each prepared using PET as the transparent substrate and E7 as the liquid crystal. The IGU was created by positioning the multi-layer film between pairs of pane spacing members 410a, 410b, 414a, 414b and a pair of transparent glass panes 402, 406, as shown in FIG. 7. The R-value, U-factor, and Center of Glass for this IGU are shown in Table 1.

Example 3

An energy-efficient IGU was created according to the embodiment shown in FIG. 6B. A panel 400 of energy-efficient glass was created utilizing two layers of energy-efficient film 100a, 100b adhered to each other with adhesive 404a, which were then adhered to a first pane 402 of transparent glass. The two layers of energy-efficient film 100a, 100b were each prepared using PET as the transparent substrate and E7 for the liquid crystal. Another dual layer film was then created by adhering two layers of energy-efficient film 100c, 100d to each other with adhesive 404b. The dual layer film was then positioned by positioning pane spacing members 410a, 410b between the energy-efficient glass panel 400 and the dual layer film 100a, 100b. The IGU was created by positioning pane spacing members 414a, 414b between a second transparent glass pane 406 and the dual layer film 100c, 100d, as shown in FIG. 6B. The R-value, U-factor, and Center of Glass for this IGU are shown in Table 1.

TABLE 1

|  | Energy Efficiency Parameter | | | |
| --- | --- | --- | --- | --- |
|  | U-Factor | R-Value | *CoG U | *CoG R |
| Example 1 | 0.25 | 4.00 | 0.230 | 4.35 |
| Example 2 | 0.21 | 4.76 | 0.186 | 5.38 |
| Example 3 | 0.20 | 5.00 | 0.175 | 5.71 |

As shown in Table 1, the energy-efficient IGUs according to exemplary embodiments of the invention meet or exceed the energy efficiency ratings for traditional low-e and double pane energy-efficient windows. For example, as shown in the Energy Star® program requirements, the U-factor for residential windows is typically required to be less than 0.30. Energy Star Program Requirements for Residential Windows, Doors, and Skylights: Version 5.0 (Apr. 7, 2009).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A film comprising:
   a first transparent substrate;
   a second transparent substrate;
   a liquid crystal layer provided between the first transparent substrate and the second transparent substrate;
   a first transparent conductive layer provided between the first transparent substrate and the liquid crystal layer;
   a second transparent conductive layer provided between the second transparent substrate and the liquid crystal layer; and
   a gasket provided on an outer edge of the film, wherein the gasket is in direct contact with the liquid crystal layer, the first transparent substrate, the second transparent substrate, the first transparent conductive layer, and the second transparent conductive layer, and wherein the first and second transparent substrates comprise a flexible polymer, and wherein the film is substantially flexible to conform to a curved surface.

2. The film according to claim 1, wherein the gasket is an adhesive and comprises a plurality of spacers.

3. The film according to claim 1, further comprising at least one of an infrared (IR) reflecting layer or an ultraviolet (UV) reflecting layer.

4. The film according to claim 1, further comprising at least one polarizing layer.

5. The film according to claim 1, further comprising a polyamide layer arranged between the liquid crystal layer and the first transparent conductive layer, or between the liquid crystal layer and the second transparent conductive layer.

6. The film according to claim 1, wherein the first and second transparent substrates are substantially flexible to conform to a curved surface.

7. The film according to claim 1, wherein the liquid crystal layer comprises a liquid crystal material and a plurality of spacers.

8. The film according to claim 7, wherein the spacers are rods that are arranged such that a diameter of the rods defines a height of the liquid crystal layer.

9. The film according to claim 7, wherein the spacers comprise at least one of rods, sticky balls, or nanostructures.

10. The film according to claim 7, wherein the spacers occupy approximately 10 to 20 percent of the liquid crystal layer by volume.

11. A glass panel comprising:
    a glass pane;
    one or more substantially flexible films, wherein each film is secured to an adjacent film by an adhesive layer, and each film comprises:
    a first transparent substrate;
    a second transparent substrate;
    a liquid crystal layer provided between the first transparent substrate and the second transparent substrate;
    a first transparent conductive layer provided between the first transparent substrate and the liquid crystal layer;
    a second transparent conductive layer provided between the second transparent substrate and the liquid crystal layer; and
    a gasket provided on an outer edge of the film, wherein the gasket is in direct contact with the liquid crystal layer, the first transparent substrate, the second transparent substrate, the first transparent conductive layer, and the second transparent conductive layer, and wherein the first and second transparent substrates comprise a flexible polymer, and wherein the film is substantially flexible to conform to a curved surface.

12. The glass panel according to claim 11, wherein the glass pane is curved, and the first and second transparent substrates are substantially flexible to conform to the curved glass pane.

13. The glass panel according to claim 11, wherein the glass pane comprises glass selected from the group consisting of glass used in building windows, glass used in doors, glass used in skylights, automotive glass, glass used in aircraft, and maritime glass.

14. A method of preparing a film, the method comprising:
 a) providing a first transparent substrate;
 b) depositing a gasket on an outer edge portion of the first transparent substrate;
 c) depositing a first conductive layer on the first transparent substrate, and within the boundary formed by the gasket;
 d) depositing a liquid crystal layer on the first transparent substrate and within the boundary formed by the gasket;
 e) positioning a second transparent substrate on the liquid crystal layer and within the boundary formed by the gasket;
 f) depositing a second conductive layer on the second transparent substrate, and within the boundary formed by the gasket; and
 g) curing an adhesive within the gasket, such that the gasket provides an outer edge of the film and the gasket is in direct contact with the liquid crystal layer, the first transparent substrate, the second transparent substrate, the first transparent conductive layer, and the second transparent conductive layer.

15. The method according to claim 14, further comprising depositing an additional layer on the film, wherein the additional layer is selected from the group consisting of a protective layer, an infrared (IR) reflective layer, an ultraviolet (UV) reflective layer, and a polarizing layer.

16. The method according to claim 14, wherein depositing the liquid crystal layer comprises spraying a mixture of liquid crystal material and spacers on the first transparent conductive layer.

17. A method of preparing a film, the method comprising:
 a) providing a first transparent substrate;
 b) positioning a gasket on an outer surface of the first transparent substrate and directly adjacent to an outer edge of the first transparent substrate;
 c) positioning a first transparent conductive layer on a top surface of the first transparent substrate and directly adjacent to an inner surface of the gasket;
 d) depositing a liquid crystal layer on a top surface of the first transparent conductive layer and directly adjacent to an inner surface of the gasket;
 e) positioning a second transparent conductive layer on a top surface of the liquid crystal layer and directly adjacent to an inner surface of the gasket;
 f) positioning a second transparent substrate on a top surface of the second transparent conductive layer and directly adjacent to an inner surface of the gasket; and
 g) curing an adhesive within the gasket.

* * * * *